United States Patent
Tzou

(10) Patent No.: US 7,035,531 B2
(45) Date of Patent: Apr. 25, 2006

(54) DEVICE AND METHOD FOR SUPPLYING COMMENTARY INFORMATION

(75) Inventor: Hon-Der Tzou, Taipei Hsien (TW)

(73) Assignee: CyberLink Corp., Taipei (TW)

( * ) Notice: Subject to any disclaimer, the term of this patent is extended or adjusted under 35 U.S.C. 154(b) by 1201 days.

(21) Appl. No.: 09/764,756

(22) Filed: Jan. 18, 2001

(65) Prior Publication Data

US 2002/0049981 A1  Apr. 25, 2002

(30) Foreign Application Priority Data

Oct. 24, 2000 (TW) .............................. 89122345 A

(51) Int. Cl.
*H04N 5/91* (2006.01)
(52) U.S. Cl. .................................. 386/95; 386/126
(58) Field of Classification Search .................. 386/46, 386/95, 125, 126; 84/609; 725/100, 105
See application file for complete search history.

(56) References Cited

U.S. PATENT DOCUMENTS

| 5,937,158 | A | * | 8/1999 | Uranaka ...................... 713/200 |
| 6,341,375 | B1 | * | 1/2002 | Watkins ....................... 725/100 |
| 6,552,254 | B1 | * | 4/2003 | Hasegawa et al. ............ 84/609 |
| 6,580,870 | B1 | * | 6/2003 | Kanazawa et al. ............ 386/95 |

* cited by examiner

*Primary Examiner*—Huy Nguyen
(74) *Attorney, Agent, or Firm*—Darby & Darby

(57) ABSTRACT

A device for supplying commentary streaming related to a data unit via a network, including: a server, for storing a commentary stream which has first commentary information and corresponding navigation commands, and outputting the commentary stream according to a data unit identifier; and a client end, for reading the data unit identifier, outputting the data unit identifier to the server via the network, receiving the commentary stream via the network, then providing second commentary information from the data unit according to the navigation commands, and then outputting commentary information corresponding to a combination of the first commentary information and the second commentary information.

17 Claims, 5 Drawing Sheets

DEVICE AND METHOD FOR SUPPLYING COMMENTARY INFORMATION

BACKGROUND OF THE INVENTION

1. Field of the Invention

The present invention relates in general to a device and method for supplying commentary information. In particular, the present invention relates to a device and method for supplying commentary information about a movie in a DVD disc through a network.

2. Description of the Related Art

The conventional way for viewers to get commentary information about a movie is from newspapers, magazines, or a supplement to the ending of a film. However, the traditional way can't meet the need that a viewer requires ready commentary information while watching a movie. Currently, commentary information can be provided on the Internet via World Wide Web (WWW) but the transmission of commentary information along with video information is time-consuming.

SUMMARY OF THE INVENTION

The object of the present invention is to provide a device and method for supplying commentary information about DVDs through a network. The related commentary information about DVDs can be offered to the users of the DVD players in the client end in real time.

To achieve the above-mentioned object, the present invention provides a device for supplying a commentary stream related to a data unit via a network. The device includes a server and a client end. The server stores the commentary stream which has first commentary information and corresponding navigation commands, and the server outputs the commentary stream according to a data unit identifier. The client end reads the data unit identifier, outputs the data unit identifier to the server via the network, receives the commentary stream via the network, then provides second commentary information from the data unit according to the navigation commands, and then outputs commentary information corresponding to a combination of the first commentary information and the second commentary information.

Another object of the present invention is that the user can record his personal commentary information and transmit it to the server for other viewers' reference.

Accordingly, the device for supplying commentary information in the present invention further includes: a navigation recoder, for recording data extracted from the data unit; a RNS (Remote Navigation Stream) multiplexer, coupled to the RNS multiplexer, for receiving the extracted data and voice images, and texts provided by the user, and outputting a client commentary stream; and an RNS transmitter, coupled to the RNS multiplexer, for transmitting the client commentary stream.

The present invention further provides a method for supplying a commentary stream related to a data unit. The method includes the steps as below. A data unit identifier of the data unit is read at a client end and the data unit identifier is transmitted from the client end to a server through a network. Then the server outputs a commentary stream having first commentary information and navigation commands to the client end according to the data unit identifier. The client end provides second commentary information from the data unit according to the navigation commands. Finally, the client end outputs commentary information corresponding to a combination of the first commentary information and the second commentary information.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

The present invention provides a method and device for accessing DVD commentary information services in a client/server environment. Thereby, DVD player users connected to Internet may have easy access to the desired information on the Internet.

Figure 1:
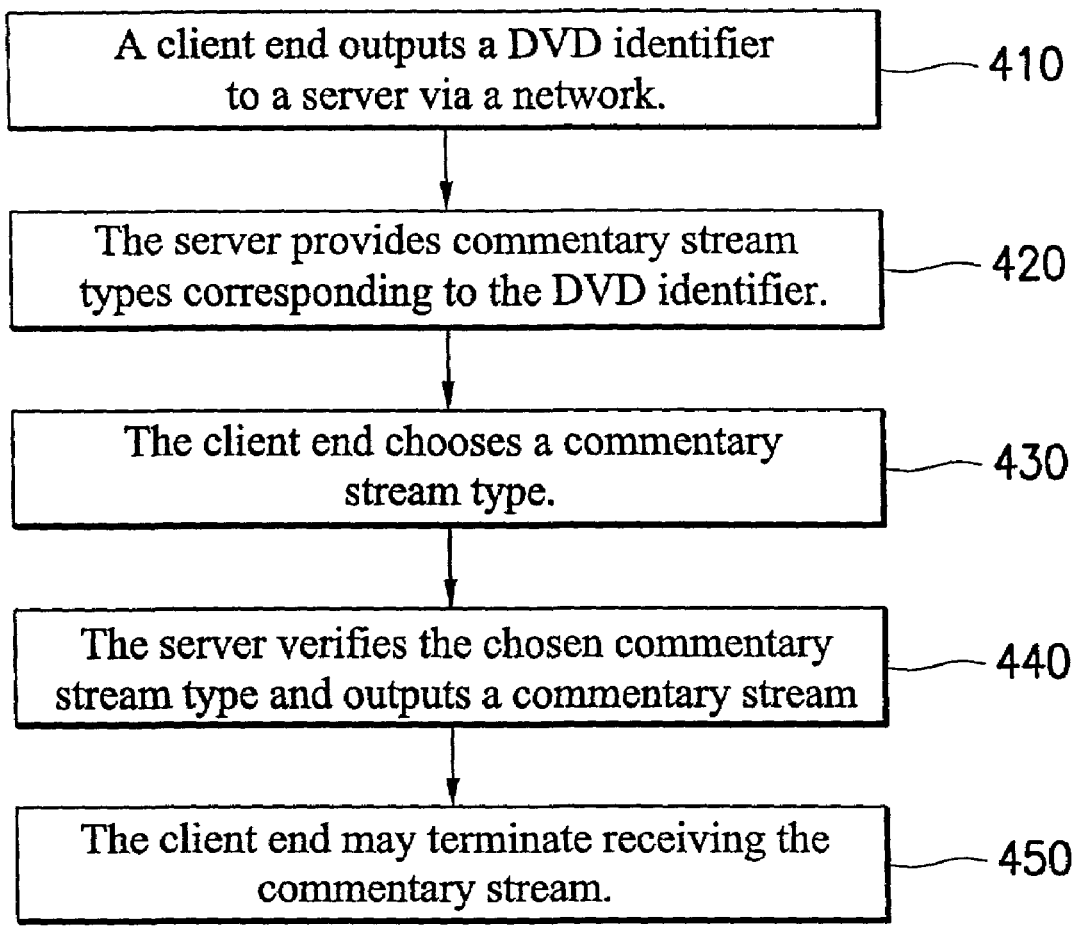
FIGS. 1~2 show flow charts of a method for processing a commentary stream in accordance with the embodiment of the present invention.

Refer to FIG. 1. At first, a client end outputs a DVD identifier to a server via a network (step 410). Then, the server provides commentary stream types corresponding to the DVD identifier (step 420). Next, after the client end chooses a commentary stream type that is desired (step 430), the server verifies the chosen commentary stream type and outputs a commentary stream (step 440). Finally, the client end may terminate receiving the commentary stream (step 450).

Figure 2:
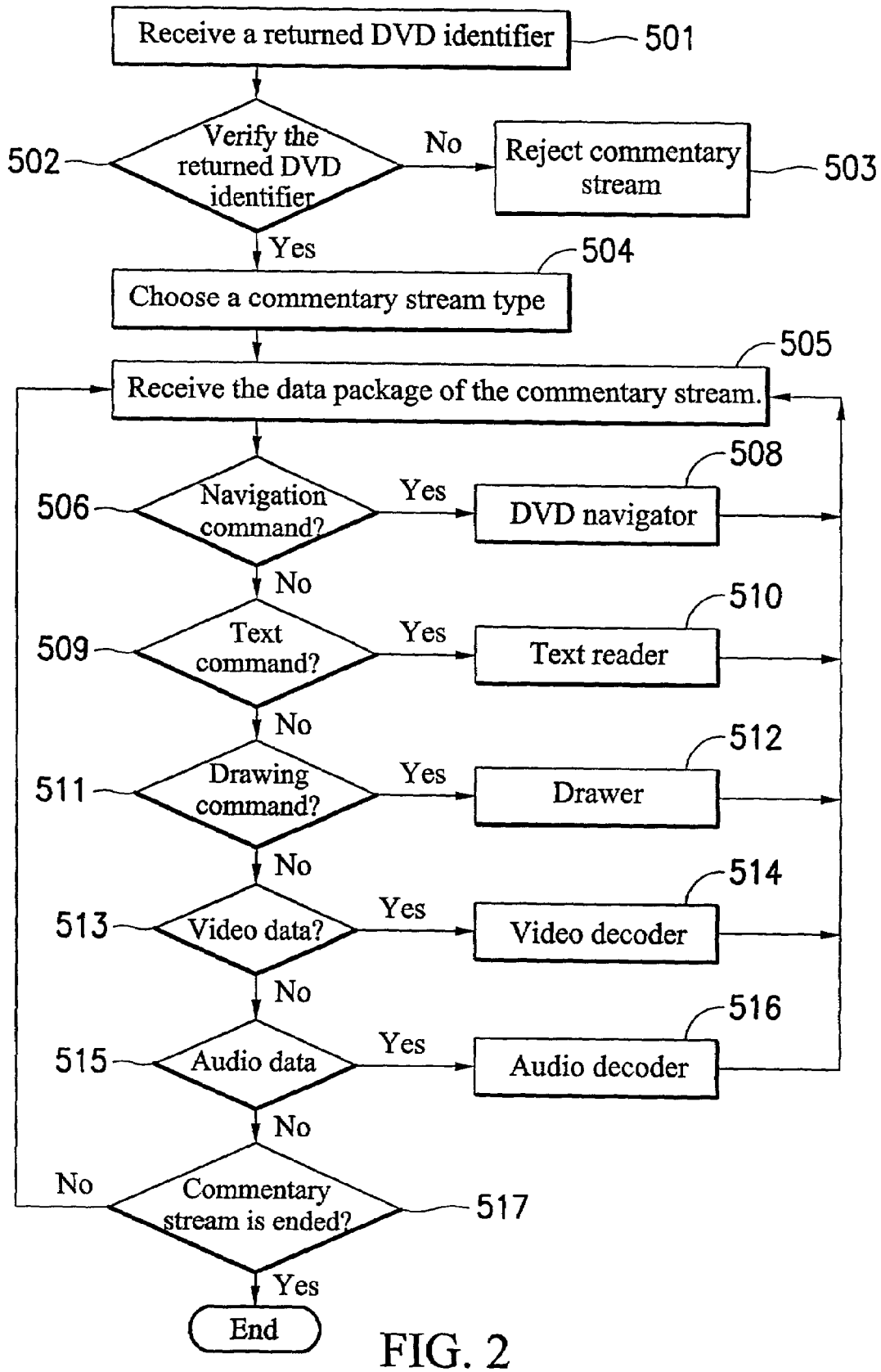

FIG. 2 is a flowchart of a process after the client end receives the commentary stream via an RNS receiver. At first, the RNS receiver of the client end receives the commentary stream and a returned DVD identifier via a network (step 501). Then, the client end verifies if the returned DVD identifier corresponds to the DVD identifier that was previously outputted (step 502). If so, the process goes to step 504; otherwise, the commentary stream is rejected (step 503). In step 504, a commentary stream type is chosen according to the request and the equipment of the client end. The commentary stream may include navigation commands, audio data, video data, text commands, and drawing commands. According to the navigation commands, the film extracts what a film critic comments on, and can be provided by the DVD. The audio data is the voice of the film critic. The video data is the image of the film critic. According to the text commands, the text data offered by the film critic can be shown. According to the drawing commands, the specific frame of the film can be marked on an area that the film critic tries to make a description of. For example, a circle can be used to mark the area. Next, in step 505 the data package of the commentary stream is received. Then, navigation commands (step 506), text commands (step 509), drawing commands(step 511), video data(step 513), and audio data (step 515) are parsed from the data package and transmitted to a DVD navigator (step 508), a text reader(step 510), a drawer (step 512), a video decoder(step 514), and an audio decoder (step 516), respectively. If the commentary stream is not ended(step 517), the process goes back to step 505 until the commentary streaming is ended.

The devices according to the embodiment of the invention are described as below.

Figure 3A:
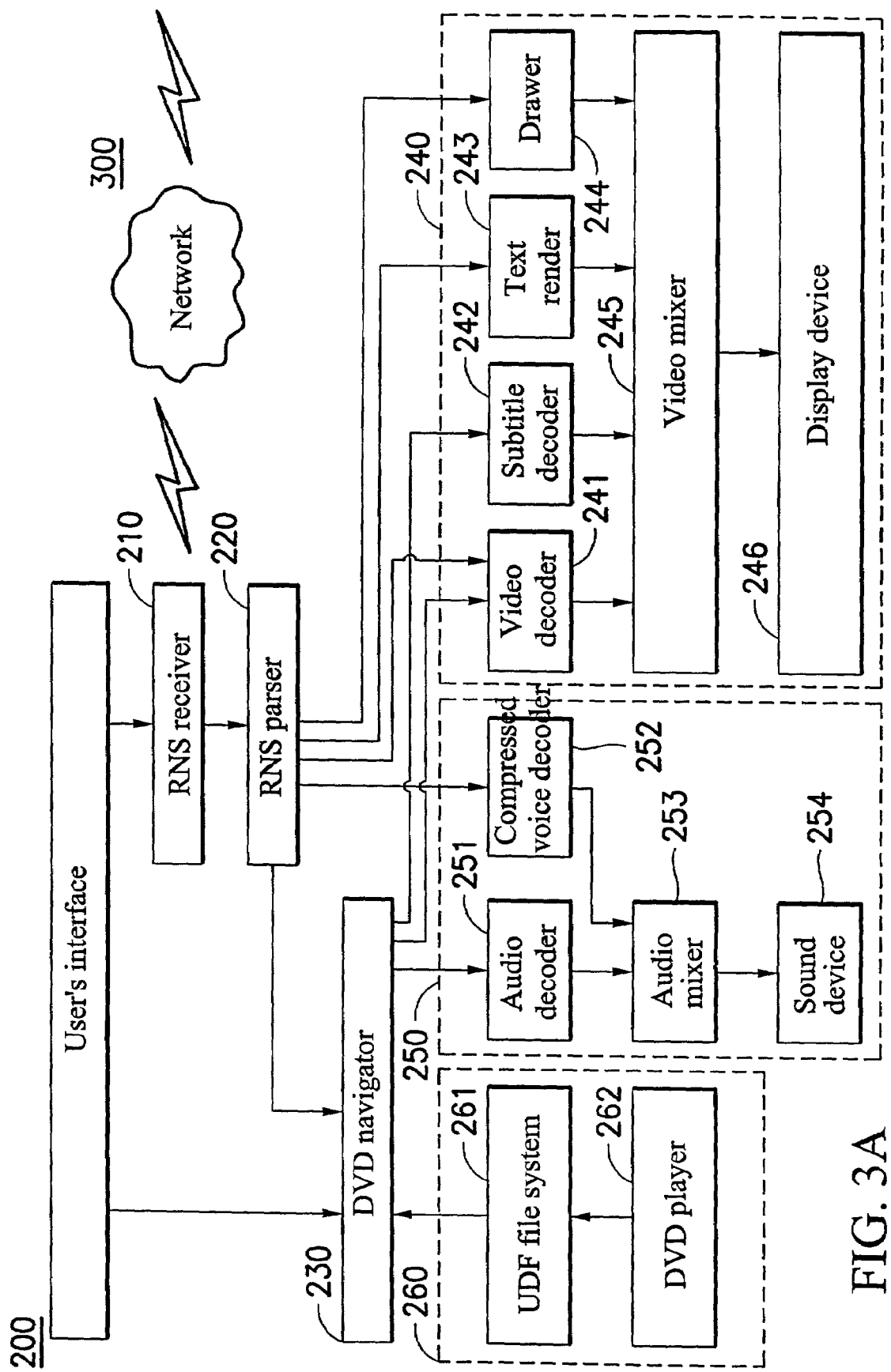
FIGS. 3A~3B show block diagrams of a device in the client end in accordance with the preferred embodiment of the present invention.

FIG. 3A shows the device of the client end 200. An RNS receiver 210 receives the commentary stream. An RNS parser 220, coupled to the RNS receiver 210, parses the commentary stream into navigation commands, audio data, video data, text commands, and drawing commands. The DVD navigator 230, coupled to the RNS parser 220, gets the film extracts a film critic comments on according to the navigation commands.

A DVD reading module 260, coupled to the DVD navigator 230, includes a DVD player 262 and an UDF (Universal Disc Format) file system 261. The DVD player 262 reads a DVD to get a DVD identifier and to provide corresponding film extracts that film critics make a description of, according to the navigation commands. The UDF (Universal Disc Format) file system 261 is a storing format for DVD data read by the DVD player 262. An audio module 250, coupled to the RNS parser 220 and the DVD navigator 230, includes an audio decoder 251, a compressed voice decoder 252, an audio mixer 253, and a sound device 254. The audio decoder 251 receives and decodes the audio part of the DVD data, in the format such as AC3, MPEG2, or LPCM. The compressed voice decoder 252 receives and decodes the compressed voice data of the film critics, in the format such as A-CELP. The audio mixer 253 mixes the audio part of the DVD data and the voice data of the film critic so as to generate mixed audio data. The sound device 254, such as a speaker, receives the mixed audio data and outputs corresponding sounds. A video module 240, coupled to the RNS parser 220 and the DVD navigator 230, includes a video decoder 241, a subtitle decoder 242, a text render 243, a drawer 244, a video mixer 245, and a display device 246. The video decoder 241 receives and decodes the video part of the DVD film extracts and the image of the film crictic in the format such as MPEG 1,2, or 4. The subtitle decoder 242 receives and decodes the subtitle part of the DVD film extracts. The text render 243 receives and decodes text commands for displaying text data from the film crictic. The drawer 244 receives and decodes the drawing commands for marking the specific frame of the DVD film. The video mixer 245 mixes the aforementioned video data and outputs them to the display device 246, such as a TV monitor, for displaying the corresponding images.

Figure 3B:
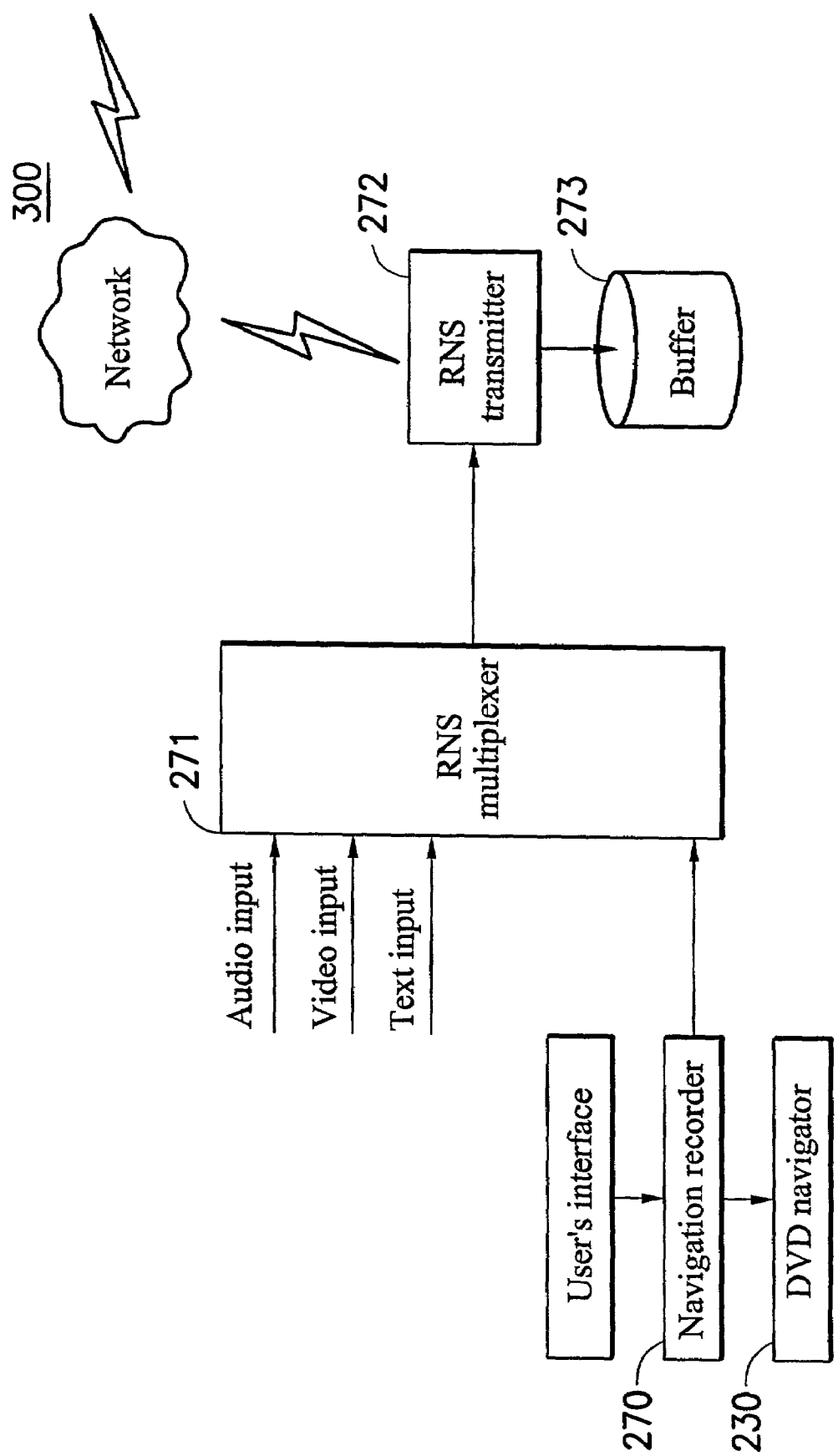

Refer to FIG. 3B. the user can also author his personal commentary information about the DVD film he is watching. The personal commentary information can be transmitted to the sever end 100 via a network 300 for the other viewers' reference. Therefore, the device of the client end 200 further includes: a navigation recorder 270, for recording data extracted from a DVD by a user; an RNS multiplexer 271, coupled to the navigation recorder 270, for receiving the extracted DVD data, and voice, images, and texts provided by the user respectively via a microphone, a video camera, and a keyboard, and outputting a client commentary stream; an RNS transmitter 272, coupled to the RNS multiplexer 271, for transmitting the client commentary stream; and a buffer 273, for storing the client commentary stream.

Figure 4:
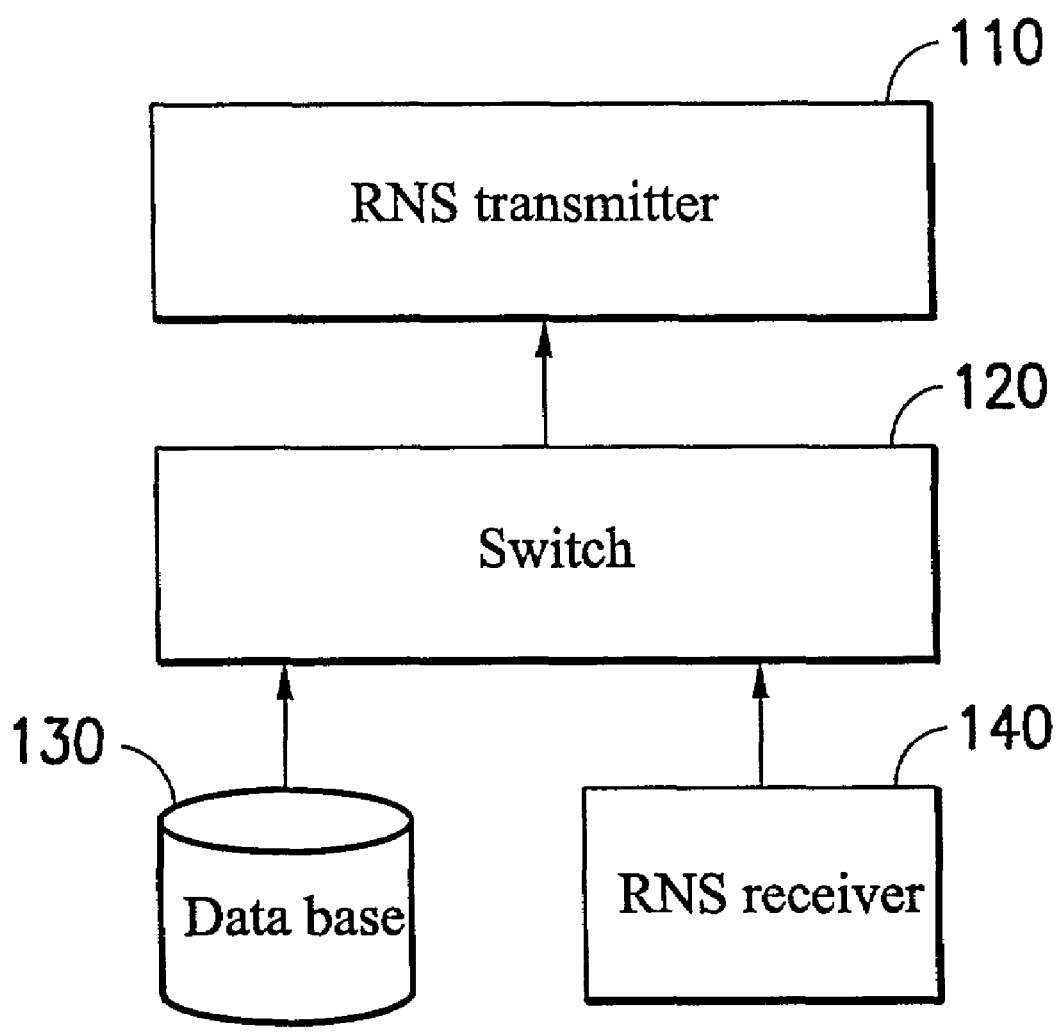
FIG. 4 shows a block diagram of a device in the server in accordance with the preferred embodiment of the present invention.

FIG. 4. shows the device of a server 100, including a data base 130, an RNS receiver 140, a switch 120, and an RNS transmitter 110. The data base 130 stores commentary streams. The RNS receiver 140 receives client commentary streams from users. The switch 120 switches between the data base 130 and the RNS receiver 140 so as to select the commentary streams or the client commentary streams to output to the RNS transmitter 110. The RNS transmitter 110 transmits the commentary streams or the client commentary streams to the client end.

While the invention has been described with reference to an illustrative embodiment, the description is not intended to be construed in a limiting sense. Various modifications of the illustrative embodiment, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. A device for supplying a commentary stream related to a data unit via a network, comprising:
   a server, for storing a commentary stream having a first commentary information and corresponding navigation commands, and outputting the commentary stream according to a data unit identifier; and
   a client end, for reading the data unit identifier, outputting the data unit identifier to the server via the network, receiving the commentary stream from the server via the network, providing specific DVD data from the data unit according to the navigation commands, and then outputting a second commentary information corresponding to a combination of the first commentary information and the specific DVD data.

2. The device as claimed in claim 1, wherein said client end comprises:
   a first RNS receiver for receiving the commentary stream;
   an RNS parser, coupled to said RNS receiver, parses the commentary stream into the navigation commands, first audio data, first video data, text commands, and drawing commands; and
   a data unit navigator, coupled to said RNS parser, for getting the specific DVD data from the data unit according to the navigation commands.

3. The device as claimed in claim 2, wherein said server comprises:
   a data base for storing the commentary stream; and
   a first RNS transmitter for transmitting the commentary stream.

4. The device as claimed in claim 2, wherein the client end further comprises:
   a data unit reading module, coupled to said data unit navigator, for reading the data unit so as to get the data unit identifier and reading the specific DVD data according to the navigation commands;
   an audio module, coupled to said RNS parser and said data unit navigator, for receiving the first audio data and an audio part of the specific DVD data; and
   a video module, coupled to said RNS parser and a DVD navigator, for receiving the first video data, the text commands, the drawing commands, and an audio part and a subtitle part of the specific DVD data.

5. The device as claimed in claim 4, wherein the client end further comprises:
   a navigation recorder, coupled to said data unit navigator, for recording data extracted from the data unit by a user;
   an RNS multiplexer, coupled to said navigation recorder, for receiving the extracted data, and voices, images, and texts provided by the user, and outputting a client commentary stream;
   a second RNS transmitter, coupled to said RNS multiplexer, for transmitting the client commentary stream.

6. The device as claimed in claim 5, wherein the client end further comprises a buffer for storing the client commentary stream.

7. The device as claimed in claim 5, wherein the server further comprises:
a second RNS receiver, for receiving the client commentary stream; and
a switch for switching between said data base and said second RNS receiver so as to select the commentary stream or the client commentary stream to output to said first RNS transmitter.

8. The device as claimed in claim 7, wherein the data unit reading module comprises:
a DVD player for reading the DVD disc to get a DVD identifier, outputting the DVD identifier to said server via the network, and reading the specific DVD data according to the navigation commands; and
an UDF (Universal Disc Format) file system, which is a storing format for the specific DVD data.

9. The device as claimed in claim 8, wherein the audio module comprises:
an audio decoder, for receiving and decoding an audio part of the specific DVD data and outputting second audio data; and
a sound device, for receiving the second audio data and outputting corresponding sounds.

10. The device as claimed in claim 8, wherein the audio module comprises:
an audio decoder, for receiving and decoding an audio part of the specific DVD data and outputting second audio data;
a compressed voice decoder, for receiving and decompressing the first audio data and outputting third audio data;
an audio mixer, for mixing the second audio data and the third audio data so as to generate mixed audio data; and
a sound device, for receiving the mixed audio data and outputting corresponding sounds.

11. The device as claimed in claim 10, wherein the video module comprises:
a video decoder, for receiving and decoding a video part of the specific DVD data and outputting second video data;
a subtitle decoder, for receiving and decoding a subtitle part of the specific DVD data and outputting third video data;
a text render, for receiving and decoding the text commands and outputting fourth video data;
a drawer, for receiving and executing the drawing commands so as to generate marks on specific areas of the video part of the specific DVD data;
a video mixer, for mixing the second video data, the third video data, the fourth video data, the marks so as to generate mixed video data; and
a display device, for receiving the mixed video data and outputting corresponding images.

12. The device as claimed in claim 11, wherein said video decoder further receives and decodes the first video data.

13. A method for supplying a commentary stream related to a data unit via a network, comprising the steps of:
getting a data unit identifier of the data unit from the client end;
transmitting the data unit identifier from the client end to a server through
a network;
outputting from the server a commentary stream having first commentary information and navigation commands according to the data unit identifier;
providing from the data unit at the client end specific DVD data according to the navigation commands; and
outputting a second commentary information corresponding to a combination of the first commentary information and the specific DVD data.

14. The method as claimed in claim 13, wherein the commentary stream comprises the navigation commands, text commands, and drawing commands.

15. The method as claimed in claim 14, wherein the commentary stream further comprises audio data and video data.

16. The method as claimed in claim 15, wherein the data unit is a DVD disc.

17. The method as claimed in claim 16, wherein the network is the Internet.

* * * * *